United States Patent
Guo

(10) Patent No.: US 11,350,296 B2
(45) Date of Patent: May 31, 2022

(54) PACKET DETECTING METHOD OF A WIRELESS SIGNAL AND PACKET DETECTING SYSTEM OF THE WIRELESS SIGNAL CAPABLE OF IDENTIFYING ADJACENT CHANNEL INTERFERENCE

(71) Applicant: Realtek Semiconductor Corp., HsinChu (TW)

(72) Inventor: Ming Zhi Guo, Suzhou (CN)

(73) Assignee: Realtek Semiconductor Corp., HsinChu (TW)

( * ) Notice: Subject to any disclaimer, the term of this patent is extended or adjusted under 35 U.S.C. 154(b) by 126 days.

(21) Appl. No.: 17/037,596

(22) Filed: Sep. 29, 2020

(65) Prior Publication Data

US 2021/0306882 A1    Sep. 30, 2021

(30) Foreign Application Priority Data

Mar. 26, 2020    (CN) .......................... 202010224491.3

(51) Int. Cl.
*H04W 24/08* (2009.01)
*H04L 1/18* (2006.01)

(52) U.S. Cl.
CPC ............... *H04W 24/08* (2013.01); *H04L 1/18* (2013.01)

(58) Field of Classification Search
CPC .. H04W 24/08; H04W 84/12; H04L 27/2688; H04L 27/2691; H04L 27/2675; H04L 27/2656; H04L 27/2663; H04L 1/0023; H04L 1/0048; H04L 1/0057; H04L 1/18
See application file for complete search history.

(56) References Cited

U.S. PATENT DOCUMENTS

| | | | |
|---|---|---|---|
| 9,474,014 B2 | 10/2016 | Pu | |
| 2008/0043649 A1* | 2/2008 | Bhukania | H04J 3/0608 370/310 |
| 2014/0003474 A1* | 1/2014 | Xin | H04J 13/0014 375/295 |
| 2016/0183170 A1* | 6/2016 | Pu | H04W 48/16 455/434 |

(Continued)

FOREIGN PATENT DOCUMENTS

CN    105703856 B    8/2018

*Primary Examiner* — Hassan Kizou
*Assistant Examiner* — Hector Reyes
(74) *Attorney, Agent, or Firm* — Winston Hsu

(57) ABSTRACT

A packet detecting method includes receiving the wireless signal, generating a local characteristic sequence, acquiring a first cross-correlation result between the wireless signal and the local characteristic sequence, determining if a packet format of the wireless signal is a target packet format according to the first correlation result, generating at least one interference characteristic sequence according to the local characteristic sequence, a signal sampling frequency, and at least one working frequency difference, acquiring a second cross-correlation result between the wireless signal and the at least one interference characteristic sequence, and detecting a center frequency of the wireless signal for determining if a packet of the wireless signal is transmitted through a target channel according to the first correlation result and the second correlation result. The at least one interference characteristic sequence corresponds to at least one interference frequency.

20 Claims, 3 Drawing Sheets

(56) References Cited

U.S. PATENT DOCUMENTS

| | | | |
|---|---|---|---|
| 2018/0234358 A1* | 8/2018 | Jakubov | H04W 4/80 |
| 2019/0238309 A1* | 8/2019 | Fort | H04L 7/042 |
| 2020/0067564 A1* | 2/2020 | Knopp | G01S 5/0221 |
| 2021/0306882 A1* | 9/2021 | Guo | H04L 27/2691 |

* cited by examiner

PACKET DETECTING METHOD OF A WIRELESS SIGNAL AND PACKET DETECTING SYSTEM OF THE WIRELESS SIGNAL CAPABLE OF IDENTIFYING ADJACENT CHANNEL INTERFERENCE

BACKGROUND OF THE INVENTION

1. Field of the Invention

The present disclosure illustrates a packet detecting method of a wireless signal and a packet detecting system of the wireless signal, and more particularly, a packet detecting method and a packet detecting system capable of identifying adjacent channel interference.

2. Description of the Prior Art

With the rapid developments of technologies, various wireless communications standards and protocols have been adopted in our daily life. For example, an IEEE 802.11 protocol family is widely used in recent years and thus becomes a universal standard for wireless local area networks (WLAN). For wireless communications systems operated under the IEEE 802.11 WEAN standard, based on wireless signals having an IEEE 802.11b, an IEEE 802.11g, or an IEEE 802.11n protocol, the wireless signals are communicated through an unlicensed frequency band at a center frequency equal to 2.4G hertz (Hz). For example, in a frequency domain, the wireless signals can be partitioned into some channels having 5 MHz frequency intervals for transmitting data at 2.4 GHz carrier frequency. Generally, for the wireless communications systems operated under the IEEE 802.11b, the IEEE 802.11g, or the IEEE 802.11n protocol, a bandwidth of the wireless signals is equal to 20 MHz. However, a frequency gap between two center frequencies of adjacent channels is 5 MHz. Therefore, frequency spectrum lobes of adjacent channels will be severely aliased. The interference of the adjacent channels may cause a malfunction result of receiving the wireless signals by a receiver.

When the frequency spectrum lobes of adjacent channels are aliased, in a time domain, reception time points of receiving the wireless signals may also be shifted. For example, if a signal transmitted through an adjacent channel arrives before a signal transmitted through a target channel, the receiver may process a packet of the signal transmitted through the adjacent channel as the signal transmitted through a target channel. Thus, it results in packet loss when a "real" signal transmitted through the target channel arrives. Further, the receiver also wastes additional power for receiving useless information. Moreover, after the receiver processes a packet of the signal transmitted through the adjacent channel, unfortunately, if the packet of the signal transmitted through the adjacent channel is successfully decoded, erroneous information of the packet may cause upper layers of the communications system to execute abnormal functions. For example, a data link between a base station (STA) and an access point (AP) of the wireless local area networks (WLAN) may be interrupted or entering an abnormal connecting status.

Currently, in a packet detecting method for the wireless signal, a cross-correlation operation between the received signal and a deterministic local characteristic sequence can be performed. After the cross-correlation operation is performed, characteristics of a peak value of a cross-correlation result can be used for determining a packet format. For example, the packet format can be determined by detecting whether the peak value is greater than a predetermined threshold or whether the peak value is periodic. However, the packet detecting method currently used lacks of high detection accuracy and is prone to misjudgment. Therefore, it is an important issue to develop a packet detection method having a high detection accuracy of the wireless signals for improving communication performance.

SUMMARY OF THE INVENTION

In an embodiment of the present disclosure, a packet detecting method of a wireless signal is disclosed. The packet detecting method comprises receiving the wireless signal, generating a local characteristic sequence, acquiring a first cross-correlation result between the wireless signal and the local characteristic sequence, determining if a packet format of the wireless signal is a target packet format according to the first correlation result, generating at least one interference characteristic sequence according to the local characteristic sequence, a signal sampling frequency, and at least one working frequency difference, acquiring a second cross-correlation result between the wireless signal and the at least one interference characteristic sequence, and detecting a center frequency of the wireless signal for determining if a packet of the wireless signal is transmitted through a target channel according to the first correlation result and the second correlation result. The at least one interference characteristic sequence corresponds to at least one interference frequency.

In another embodiment of the present disclosure, a packet detecting system of the wireless signal is disclosed. The packet detecting system comprises a transmitter, a receiver, a processor, and a memory. The packet detecting system is configured to transmit the wireless signal. The receiver is configured to receive the wireless signal. The processor is coupled to the receiver and configured to process the wireless signal. The memory is coupled to the processor and configured to save data. The processor generates a local characteristic sequence and executes a cross-correlation operation between the wireless signal and the local characteristic sequence for acquiring a first cross-correlation result. The processor generates at least one interference characteristic sequence according to the local characteristic sequence, a signal sampling frequency of the receiver, and at least one working frequency difference, executes a cross-correlation operation between the wireless signal and the at least one interference characteristic sequence for acquiring a second cross-correlation result. The processor detects a center frequency of the wireless signal for determining if a packet of the wireless signal is transmitted through a target channel according to the first correlation result and the second correlation result. The at least one interference characteristic sequence corresponds to at least one interference frequency.

These and other objectives of the present disclosure will no doubt become obvious to those of ordinary skill in the art after reading the following detailed description of the preferred embodiment that is illustrated in the various figures and drawings.

DETAILED DESCRIPTION

Figure 1:
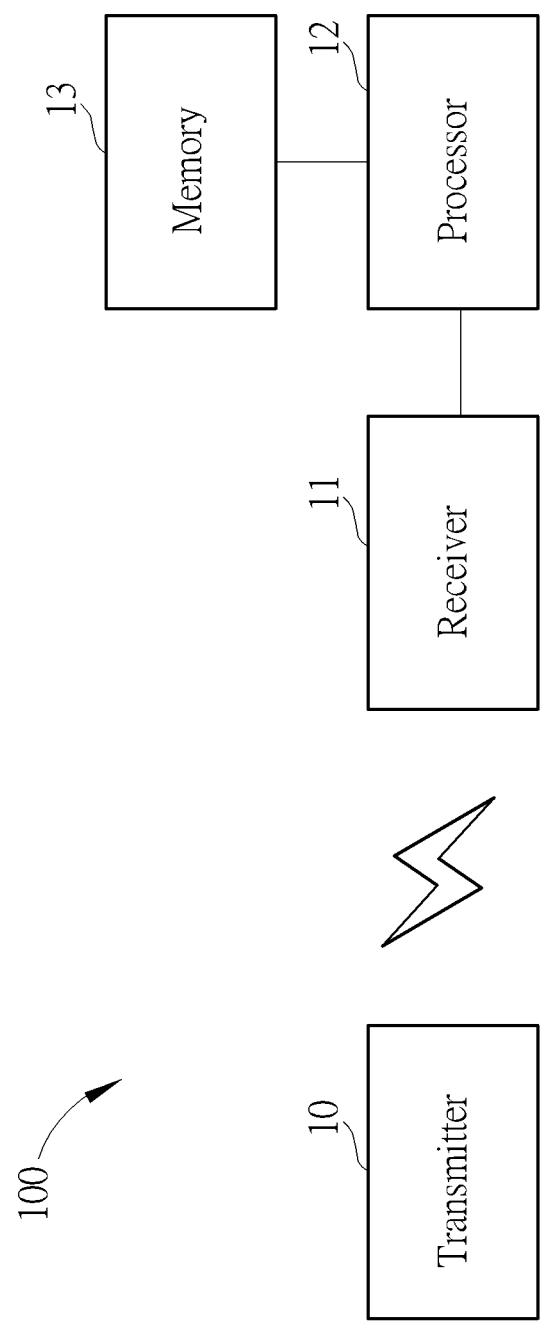
FIG. 1 is a block diagram of a packet detecting system of a wireless signal according to an embodiment of the present disclosure.

FIG. 1 is a block diagram of a packet detecting system 100 of a wireless signal according to an embodiment of the present disclosure. For simplicity, the packet detecting system 100 of the wireless signal is called as "the packet detecting system 100" hereafter. The packet detecting system 100 can be used for performing data communications between a base station (STA) and an access point (AP). The packet detecting system 100 has a reliable signal source identification capability. In FIG. 1, the packet detecting system 100 can include a transmitter 10, a receiver 11, a processor 12, and a memory 13. The transmitter 10 is used for transmitting the wireless signal. The transmitter 10 can be any signal emitting device, such as an antenna module for emitting signals at a specific frequency band. The receiver 11 is used for receiving the wireless signal. A working frequency of the receiver 11 can be pre-configured. Then, the receiver 11 can receive and process the wireless signal under the working frequency. The processor 12 is coupled to the receiver 11 for processing the wireless signal. The processor 12 can be any programmable processing element, such as a central processing unit, a processing chip, or a logic circuit. The memory 13 is coupled to the processor 12 for saving data. In the packet detecting system 100, the processor 12 can generate a local characteristic sequence and executes a cross-correlation operation between the wireless signal received by the receiver 11 and the local characteristic sequence for acquiring a first cross-correlation result. Then, the processor 12 can generate at least one interference characteristic sequence according to the local characteristic sequence, a signal sampling frequency of the receiver 11, and at least one working frequency difference. Further, the processor 12 can execute a cross-correlation operation between the wireless signal and the at least one interference characteristic sequence for acquiring a second cross-correlation result. The processor 12 detects a center frequency of the wireless signal for determining if a packet of the wireless signal is transmitted through a target channel according to the first correlation result and the second correlation result. In the packet detecting system 100, the at least one interference characteristic sequence corresponds to at least one interference frequency. Details of executing a packet detecting method by the packet detecting system 100 are illustrated later.

Figure 2:
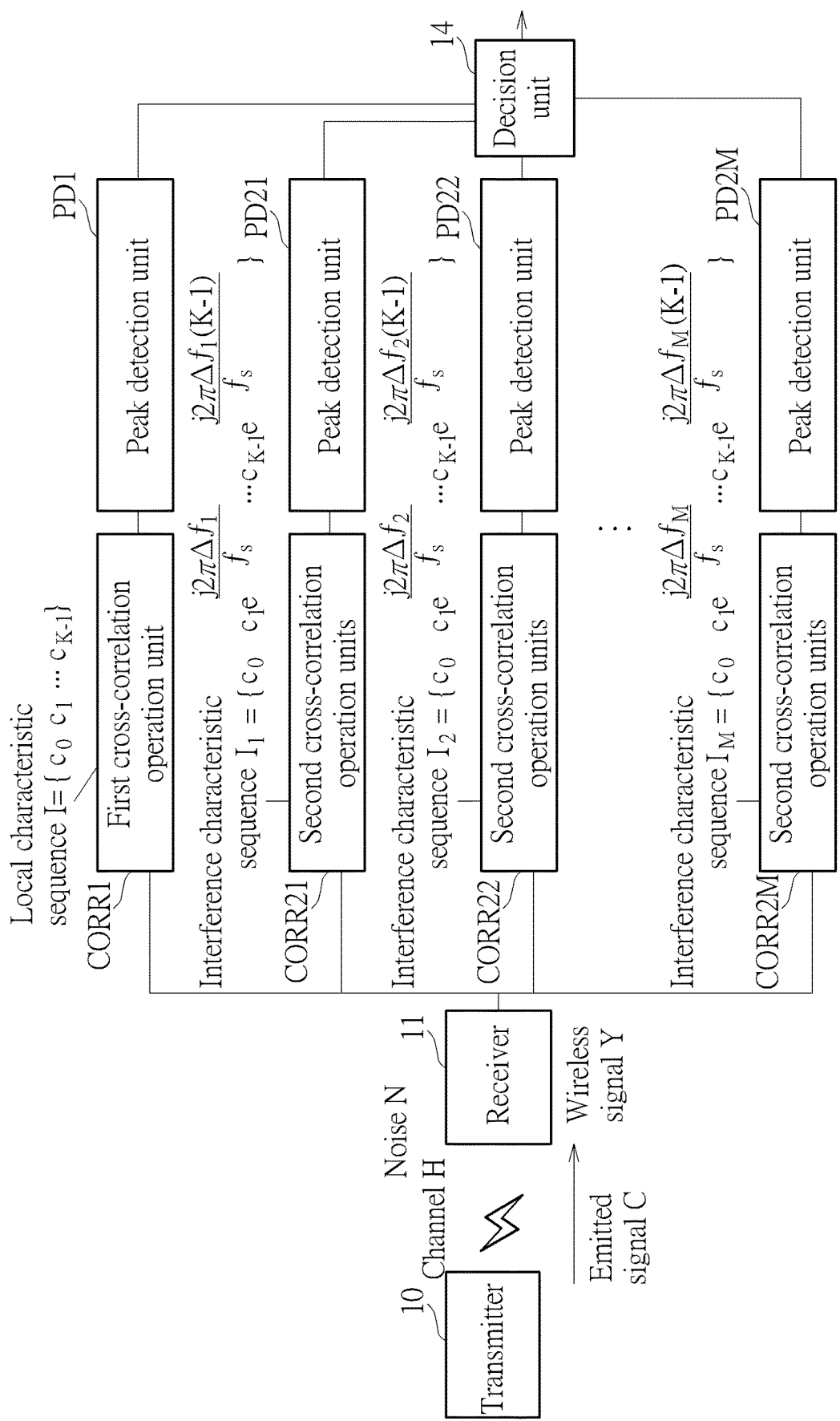
FIG. 2 is an illustration of a packet detecting process executed by the packet detecting system of the wireless signal in FIG. 1.

FIG. 2 is an illustration of a packet detecting process executed by the packet detecting system 100. Here, in FIG. 2, a first cross-correlation operation unit CORR1, second cross-correlation operation units CORR21 to CORR2M, a peak detection unit PD1, peak detection units PD21 to PD2M, and a decision unit 14 can be integrated into the processor 12, or can be some software functional blocks of the processor 12, or can be independent hardware circuits. Any reasonable hardware modification falls into the scope of the present disclosure. The local characteristic sequence I can be a deterministic sequence saved in the memory 13. The local characteristic sequence I can be represented as a vector of length K, such as $\{c_0 \ c_1 \ \ldots \ c_{K-1}\}$. K is a positive integer. A signal sampling frequency of the receiver 11 can be denoted as $f_s$. A working frequency (center frequency) of the receiver 11 can be denoted as $f_c$. A signal frequency band and frequency intervals of adjacent channels can be used for determining interference frequencies of the adjacent channels, and further used for deriving working frequency differences. For example, when an interference frequency of an adjacent channel is equal to $f_I$, working frequency differences can be derived as $f_c-f_I$ and $f_c+f_I$. In practice, the wireless signal can be partitioned into some channels having 5 MHz frequency intervals for transmitting data in the 2.4 GHz carrier frequency. A bandwidth of the wireless signal is 20 MHz. Therefore, working frequency differences can be considered as +5 MHz and ±10 MHz.

As previously mentioned, the processor 12 can determine at least one working frequency according to the signal frequency band and the frequency intervals of adjacent channels, such as a frequency difference $\Delta f_1=+5$ MHz, a frequency difference $\Delta f_2=-5$ MHz, a frequency difference $\Delta f_3=+10$ MHz, and a frequency difference $\Delta f_4=-10$ MHz. Further, the processor 12 can rotate each phase of the local characteristic sequence I for generating the at least one interference characteristic sequence (i.e., such as M interference characteristic sequences $I_1$ to $I_M$ in FIG. 2) according to the local characteristic sequence I, the signal sampling frequency $f_s$, and the at least one working frequency difference (i.e., such as M working frequency differences $\Delta f_1$ to $\Delta f_M$ in FIG. 2). For example, an $m^{th}$ interference characteristic sequence $I_m$ can be written as:

$$I_m = \left\{ c_0 \ c_1 e^{\frac{j2\pi \Delta f_m}{f_s}} \ \ldots \ c_{K-1} e^{\frac{j2\pi \Delta f_m (K-1)}{f_s}} \right\}$$

In other words, the $m^{th}$ interference characteristic sequence $I_m$ can be generated by sequentially rotating phases of elements of the local characteristic sequence $\{c_0 \ c_1 \ \ldots \ c_{K-1}\}$ according to $m^{th}$ working frequency difference $\Delta f_m$. Therefore, the processor 12 can previously generate the local characteristic sequence I and M interference characteristic sequences $I_1$ to $I_M$ to the memory 13 for detecting a packet format of the wireless signal Y received by the receiver 11. Details are illustrated later.

In FIG. 2, the transmitter 10 can generate an emitted signal C. The emitted signal C is distorted by impulse responses of a channel H and noise N. Then, the emitted signal C can be received by the receiver 11. Here, the emitted signal C received by the receiver 11 through the channel H and the noise N is denoted as a wireless signal Y. Therefore, the wireless signal Y of the receiver 11 can be written as Y=H⊗C+N. "⊗" is denoted as a convolution symbol. The wireless signal Y, the emitted signal C, and the noise N can be expressed in forms of vectors. For example, the wireless signal Y can be expressed as $Y=\{y_0 \ y_1 \ \ldots \ y_{K+L-1}\}$. Impulse responses of the channel H can be expressed as $H=\{h_0 \ h_1 \ \ldots \ h_{L-1}\}$. The noise N can be expressed as $N=\{n_0 \ n_1 \ \ldots \ n_{K+L-1}\}$. L is denoted as a length of channel taps. The emitted signal C and the local characteristic sequence I can be identical. Therefore, the emitted signal C can be expressed as $C=\{c_0 \ c_1 \ \ldots \ c_{K-1}\}$. After the wireless signal Y of the receiver 11 is generated, the processor 12 can use the first cross-correlation operation unit CORR1 for performing a cross-correlation operation between the wireless signal Y and the local characteristic sequence I to generate a first cross-correlation result. Further, the processor 12 can use the peak detection unit PD1 for detecting a peak value of the first cross-correlation result. Further, the processor 12 can determine if a periodic peak value is present by observing a plurality of symbols. The processor 12 can also determine if a plurality of peak values are greater than a threshold during Nsym symbol periods of the wireless signal. Nsym is a positive integer. For example, the processor 12 can detect peak values during 50 consecutive symbol periods for determining if the peak values are periodic and determining if the peak values are greater than the threshold. According to cross-correlation properties, when the periodic peak value is present and the plurality of peak values are greater than the threshold during the Nsym symbol periods of the wireless signal Y, the packet format of the wireless signal Y is detected as the target packet format by the processor 12. Conversely, when the periodic peak value is absent or at least one peak value is smaller than the threshold during the Nsym symbol periods of the wireless signal Y, the packet format of the wireless signal Y is not the target packet format. However, in the above packet detection method, when the receiver 11 receives the wireless signal Y of the adjacent channel, the wireless signal Y of the adjacent channel can also satisfy a periodic peak value and a peak amplitude conditions previously mentioned. Therefore, the processor 12 may generate a wrong detection result. Therefore, the packet detecting system 100 can introduce M interference characteristic sequences $I_1$ to $I_M$ for improving the packet detecting accuracy. Details are described below.

In FIG. 2, after the M interference characteristic sequences $I_1$ to $I_M$ are generated, the processor 12 can generate M second cross-correlation results by using M cross-correlation operations between the wireless signal Y and the M interference characteristic sequences $I_1$ to $I_M$. As previously mentioned, the wireless signal Y can be written as Y=H⊗C+N. "⊗" is denoted as the convolution symbol. The wireless signal Y, the emitted signal C, and the noise N can be expressed in forms of vectors. The wireless signal Y can be expressed as Y={$y_0$ $y_1$ ... $y_{K+L-1}$}. Impulse responses of the channel H can be expressed as H={$h_0$ $h_1$ ... $h_{L-1}$}. The noise N can be expressed as N={$n_0$ $n_1$ ... $n_{K+L-1}$}. The emitted signal C and the local characteristic sequence I can be identical. Therefore, the emitted signal C can be expressed as C={$c_0$ $c_1$ ... $c_{K-1}$}. When a frequency difference Δf is present between the emitted signal C and the wireless signal Y of the receiver 11 (i.e., Δf=$Δf_m$), the emitted signal C can be generally expressed by introducing a frequency difference factor $Δf_m$, as $$\left\{ c_0 \quad c_1 e^{\frac{j2\pi\Delta f_m}{f_s}} \quad \ldots \quad c_{K-1} e^{\frac{j2\pi\Delta f_m(K-1)}{f_s}} \right\}.$$

Therefore, without loss of generality, the "characteristic sequence" can be written as $$\left\{ c_0 \quad c_1 e^{\frac{j2\pi\Delta f_m}{f_s}} \quad \ldots \quad c_{K-1} e^{\frac{j2\pi\Delta f_m(K-1)}{f_s}} \right\}.$$

Particularly, the characteristic sequence becomes the local characteristic sequence C={$c_0$ $c_1$ ... $c_{K-1}$} for $Δf_m$=0. For $Δf_m$ is a non-zero number, the characteristic sequence becomes the $m^{th}$ interference characteristic sequence $$\left\{ c_0 \quad c_1 e^{\frac{j2\pi\Delta f_m}{f_s}} \quad \ldots \quad c_{K-1} e^{\frac{j2\pi\Delta f_m(K-1)}{f_s}} \right\}.$$

Therefore, after the processor 12 executes the cross-correlation operation between the wireless signal Y and the $m^{th}$ interference characteristic sequence $I_m$, the $m^{th}$ second cross-correlation result can be derived as:

$$B_m(p) \approx \sum_{l=0}^{L-1} h_l \left( \sum_{k=0}^{K-1} c_{p+k-l} \times c_k^* \times e^{j\left(\frac{2\pi\Delta f_m(p-1)}{f_s}\right)} \right)$$

Here, $B_m(p)$ can be regarded as $p^{th}$ output value of the $m^{th}$ second cross-correlation result corresponding to $m^{th}$ interference characteristic sequence $I_m$. "*" is denoted as a complex conjugate symbol. In other words, after the processor 12 executes the cross-correlation operation between the wireless signal Y and the $m^{th}$ interference characteristic sequence $I_m$, the output values of $m^{th}$ second cross-correlation result can be sequentially generated. Similarly, after the processor 12 executes the cross-correlation operation between the wireless signal Y and M interference characteristic sequences $I_1$ to $I_M$, the output values of M second cross-correlation results (i.e., $B_1(p)$ to $B_M(p)$ for a symbol index p) can be generated. Further, the processor 12 can use the peak detection units PD21 to PD2M for detecting peak values of the second cross-correlation results between the wireless signal Y and the at least one interference characteristic sequence $I_1$ to $I_M$ during each symbol period. Then, the processor 12 can acquire at least one total peak value corresponding to the at least one interference characteristic sequence $I_1$ to $I_M$ during a plurality of symbol periods. For example, for a symbol period, the output values of $m^{th}$ second cross-correlation result $B_m$ can be written as:

$$B_m=[B_m(0) B_m(1) B_m(2) \ldots]$$

The peak value $MP_m$ can be written as:

$$MP_m = \max\{\text{abs}(B_m(k))\}$$

Here, "abs(•)" is an absolute value function. "max(•)" is a maximum value function. Then, the processor 12 can acquire $m^{th}$ total peak value of the $m^{th}$ second cross-correlation result between the wireless signal Y and the $m^{th}$ interference characteristic sequence $I_m$ during Q symbol periods. Q is a positive integer. In practice, the processor 12 can use an accumulation function for deriving the $m^{th}$ total peak value during the Q symbol periods. The $m^{th}$ total peak value corresponds to the $m^{th}$ interference characteristic sequence $I_m$, denoted as $SMP_m$. Similarly, the processor 12 can acquire M total peak values $SMP_1$ to $SMP_M$ according to the wireless signal Y and M interference characteristic sequences $I_1$ to $I_M$ during the Q symbol periods.

As previously mentioned, the local characteristic sequence I can be used for detecting if the wireless signal Y is transmitted through the target channel. It is assumed that the frequency offset (or say, frequency difference) is absent (i.e., $Δf_m$=0) under the target channel. Further, M interference characteristic sequences $I_1$ to $I_M$ can be used for detecting if the wireless signal Y is transmitted through the adjacent channels. The adjacent channels correspond to a plurality of frequency offsets (i.e., frequency differences $Δf_1$ to $Δf_M$ are non-zero numbers). Therefore, the packet detecting system 100 can use mathematic models of the local characteristic sequence I and the M interference characteristic sequences $I_1$ to $I_M$ for determining a channel type for carrying the wireless signal Y (i.e., the target channel or certain adjacent channels). Therefore, the processor 12 can detect a peak value of the first cross-correlation result between the wireless signal Y and the local characteristic sequence I during each symbol period. Further, the processor 12 can acquire a total peak value corresponding to the local characteristic sequence I during the Q symbol periods, denoted as $SMP_0$. Here, the local characteristic sequence I can be regarded as a special case of the $m^{th}$ interference characteristic sequence $I_m$ for $\Delta f_m=0$. In other words, $$I_m = \left\{ c_0 \quad c_1 e^{\frac{j2\pi\Delta f_m}{f_s}} \quad \ldots \quad c_{K-1} e^{\frac{j2\pi\Delta f_m(K-1)}{f_s}} \right\}$$

becomes $I=\{c_0\ c_1\ \ldots\ c_{K-1}\}$ for $\Delta f_m=0$. Therefore, a generation method of the total peak value $SMP_0$ corresponding to the local characteristic sequence I during the Q symbol periods is similar to the generation method of the total peak values $SMP_1$ to $SMP_M$. Thus, details are omitted here. Then, the processor 12 can use the decision unit 14 for determining that the wireless signal Y having a center frequency is transmitted through the target channel when the total peak value $SMP_0$ corresponding to the local characteristic sequence I is greater than a linear combination result formed by combining the at least one total peak value (i.e., such as $SMP_1$ to $SMP_M$) corresponding to the at least one interference characteristic sequence (i.e., such as $I_1$ to $I_M$) with a threshold Pth. Thus, the center frequency of the wireless signal Y is substantially equal to the working frequency of the receiver 11. Then, the processor 12 can generate a successful reception message of receiving the packet of the wireless signal Y transmitted through the target channel. In other words, a condition that the packet of the wireless signal Y is transmitted through the target channel is: $SMP_0>SMP_1\times Pth$ and $SMP_0>SMP_2\times Pth$ and $SMP_0>SMP_3\times Pth\ldots$, and $SMP_0>SMP_m\times Pth$. The threshold Pth can be a user-defined positive integer. Briefly, if the total peak value $SMP_0$ corresponding to the local characteristic sequence I is large enough, it can be determined that the packet of the wireless signal Y is transmitted through the target channel.

Conversely, the processor 12 can generate a reception failure message of receiving the packet of the wireless signal S transmitted through an interference channel (or any adjacent channel) when the total peak value $SMP_0$ corresponding to the local characteristic sequence I is smaller than a linear combination result formed by combining any total peak value of the at least one total peak value (such as $SMP_1$ to $SMP_M$) with the threshold Pth. In other words, a condition that the packet of the wireless signal Y is transmitted through the interference channel or any adjacent channel is: $SMP_0<SMP_1\times Pth$ or $SMP_0<SMP_2\times Pth$ or $SMP_0<SMP_3\times Pth\ldots$, or $SMP_0<SMP_m\times Pth$. Briefly, if the total peak value $SMP_0$ corresponding to the local characteristic sequence I is insufficient, it can be determined that the packet of the wireless signal Y is transmitted through the interference channel or any adjacent channel. The center frequency of the wireless signal Y is biased (i.e., for example, the frequency difference $\Delta f_1=5$ MHz).

Therefore, the packet detecting method performed by the packet detecting system 100 can be regarded as a two-stage detection method. In a first stage, the packet detecting system 100 can perform a cross-correlation operation between the wireless signal Y received by the receiver 11 and the local characteristic sequence I. Then, the packet detecting system 100 can use characteristics of the peak value for determining the packet format. In the second stage, the packet detecting system 100 can perform several cross-correlation operations between the wireless signal Y and at least one interference characteristic sequences ($I_1$ to $I_M$) for detecting if the center frequency of the wireless signal Y is biased. If the center frequency of the wireless signal Y corresponds to the local characteristic sequence, it implies that the packet of the wireless signal Y is transmitted through the target channel. If the center frequency of the wireless signal Y corresponds to an interference characteristic sequence, it implies that the packet of the wireless signal Y is transmitted through an interference channel. Further, as previously mentioned, the $p^{th}$ output value of the $m^{th}$ second cross-correlation result $B_m(p)$ can be written as:

$$B_m(p) \approx \sum_{l=0}^{L-1} h_l \left( \sum_{k=0}^{K-1} c_{p+k-l} \times c_k^* \times e^{j\left(\frac{2\pi\Delta f_m(p-1)}{f_s}\right)} \right)$$

Here, $B_m(p)$ includes the impulse responses of the channel H. In other words, $B_m(p)$ may be distorted by the impulse responses of the channel H. Therefore, in the packet detecting system 100, the processor 12 can control the receiver 11 to execute an automatic gain control (AGC) process for improving the packet detecting accuracy. Further, when an offset of a carrier frequency is present or high mobility of the transmitter 10 and/or receiver 11 is detected, the carrier frequency offset (CFO) is generated. Therefore, the processor 12 can control the receiver 11 to execute a carrier frequency offset compensation process for increasing the packet detection accuracy. Any reasonable technology for increasing the packet detection accuracy falls into the scope of the present disclosure.

Figure 3:
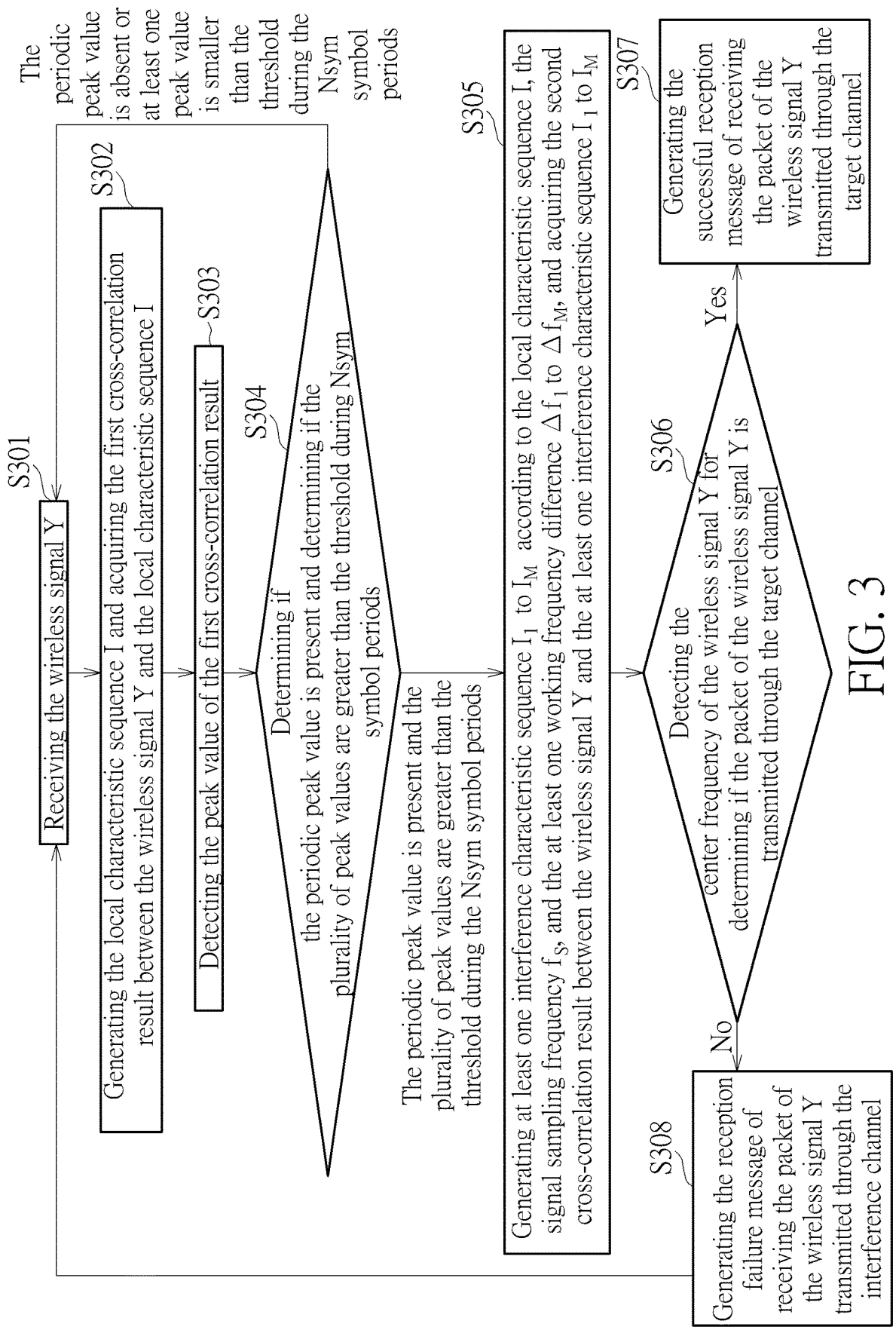
FIG. 3 is a flow chart of a packet detecting method executed by the packet detecting system of the wireless signal in FIG. 1.

FIG. 3 is a flow chart of a packet detecting method executed by the packet detecting system 100. The packet detecting method includes step S301 to step S308. Any reasonable technology or step modification falls into the scope of the present disclosure. Step S301 to step S308 are illustrated below.

step S301: receiving the wireless signal Y;
step S302: generating the local characteristic sequence I and acquiring the first cross-correlation result between the wireless signal Y and the local characteristic sequence I;
step S303: detecting the peak value of the first cross-correlation result;
step S304: determining if the periodic peak value is present and determining if the plurality of peak values are greater than the threshold during Nsym symbol periods; if the periodic peak value is present and the plurality of peak values are greater than the threshold during the Nsym symbol periods, executing step S305, else, executing step S301;
step S305: generating at least one interference characteristic sequence $I_1$ to $I_M$ according to the local characteristic sequence I, the signal sampling frequency $f_s$, and the at least one working frequency difference $\Delta f_1$ to $\Delta f_m$, and acquiring the second cross-correlation result between the wireless signal Y and the at least one interference characteristic sequence $I_1$ to $I_M$;
step S306: detecting the center frequency of the wireless signal Y for determining if the packet of the wireless signal Y is transmitted through the target channel according to the first correlation result and the second correlation result; if yes, executing step S307; if no, executing step S308;

step S307: generating the successful reception message of receiving the packet of the wireless signal Y transmitted through the target channel.

step S308: generating the reception failure message of receiving the packet of the wireless signal Y transmitted through the interference channel, and executing step S301 for continuously receiving the wireless signal Y.

Details of step S301 to step S308 are previously illustrated. Thus, they are omitted here. The packet detecting system 100 can use the local characteristic sequence I and at least one interference characteristic sequence $I_1$ to $I_M$ for accurately detecting the center frequency of the wireless signal Y of the receiver 11. By doing so, the packet detecting system 100 can determine if the packet of the wireless signal Y is transmitted through the target channel. Therefore, an error detection probability of the packet detecting system 100 can be greatly reduced.

To sum up, the present disclosure illustrates a packet detecting method and a packet detecting system of a wireless signal. Since a conventional packet detecting method uses a single-stage process for determining if a packet format satisfies a target packet format of a target channel according to a local characteristic sequence, an error detection probability is high. In order to improve a packet detecting accuracy, the packet detecting method of the present disclosure uses a two-stage process for detecting a center frequency of the wireless signal by introducing at least one interference characteristic sequence. Since the center frequency of the wireless signal can be detected, the packet detecting system can accurately determine if the packet of the wireless signal is transmitted through the target channel. In other words, even if a detecting result is wrong in a first stage, the detecting result can be calibrated in a second stage. Therefore, the packet detecting system of the present disclosure has a high packet detecting reliability.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A packet detecting method of a wireless signal comprising:
   receiving the wireless signal;
   generating a local characteristic sequence;
   acquiring a first cross-correlation result between the wireless signal and the local characteristic sequence;
   determining if a packet format of the wireless signal is a target packet format according to the first correlation result;
   generating at least one interference characteristic sequence according to the local characteristic sequence, a signal sampling frequency, and at least one working frequency difference;
   acquiring a second cross-correlation result between the wireless signal and the at least one interference characteristic sequence; and
   detecting a center frequency of the wireless signal for determining if a packet of the wireless signal is transmitted through a target channel according to the first correlation result and the second correlation result;
   wherein the at least one interference characteristic sequence corresponds to at least one interference frequency.

2. The method of claim 1, further comprising:
   detecting a peak value of the first cross-correlation result between the wireless signal and the local characteristic sequence;
   determining if a periodic peak value is present; and
   determining if a plurality of peak values are greater than a threshold during Nsym symbol periods of the wireless signal;
   wherein Nsym is a positive integer.

3. The method of claim 2, wherein when the periodic peak value is present and the plurality of peak values are greater than the threshold during the Nsym symbol periods of the wireless signal, the packet format of the wireless signal is detected as the target packet format, and when the periodic peak value is absent or at least one peak value is smaller than the threshold during the Nsym symbol periods of the wireless signal, the packet format of the wireless signal is not the target packet format.

4. The method of claim 1, wherein generating the at least one interference characteristic sequence according to the local characteristic sequence, the signal sampling frequency, and the at least one working frequency difference comprises:
   determining the at least one interference frequency;
   determining the at least one working frequency difference according to a working frequency and the at least one interference frequency; and
   rotating each phase of the local characteristic sequence for generating the at least one interference characteristic sequence according to the local characteristic sequence, the signal sampling frequency, and the at least one working frequency difference.

5. The method of claim 1, further comprising:
   detecting a peak value of the second cross-correlation result between the wireless signal and the at least one interference characteristic sequence during each symbol period; and
   acquiring at least one total peak value corresponding to the at least one interference characteristic sequence during a plurality of symbol periods.

6. The method of claim 5, further comprising:
   detecting a peak value of the first cross-correlation result between the wireless signal and the local characteristic sequence during the each symbol period;
   acquiring a total peak value corresponding to the local characteristic sequence during the plurality of symbol periods;
   determining that the wireless signal having the center frequency is transmitted through the target channel when the total peak value corresponding to the local characteristic sequence is greater than a linear combination result formed by combining the at least one total peak value corresponding to the at least one interference characteristic sequence with a threshold; and
   generating a successful reception message of receiving the packet of the wireless signal transmitted through the target channel;
   wherein the threshold is a positive integer.

7. The method of claim 5, further comprising:
   detecting a peak value of the first cross-correlation result between the wireless signal and the local characteristic sequence during the each symbol period;
   acquiring a total peak value corresponding to the local characteristic sequence during the plurality of symbol periods; and
   generating a reception failure message of receiving the packet of the wireless signal transmitted through an interference channel when the total peak value corresponding to the local characteristic sequence is smaller than a linear combination result formed by combining any total peak value of the at least one total peak value with a threshold;

wherein the threshold is a positive integer.

8. The method of claim 1, wherein generating the at least one interference characteristic sequence according to the local characteristic sequence, the signal sampling frequency, and the at least one working frequency difference satisfies an equation:

$$I_m = \left\{ c_0 \quad c_1 e^{\frac{j2\pi\Delta f_m}{f_s}} \quad \ldots \quad c_{K-1} e^{\frac{j2\pi\Delta f_m(K-1)}{f_s}} \right\}$$

where $I_m$ is an $m^{th}$ interference characteristic sequence, $\{c_0 \ c_1 \ldots c_{K-1}\}$ is the local characteristic sequence, $f_s$ is the signal sampling frequency, $\Delta f_m$ is an $m^{th}$ working frequency difference, and K is a positive integer.

9. The method of claim 8, wherein when the packet of the wireless signal is transmitted through the target channel, the center frequency of the wireless signal is substantially equal to a working frequency.

10. The method of claim 1, further comprising:

executing an automatic gain control (AGC) process and/ or a carrier frequency offset (CFO) compensation process to the wireless signal for increasing a packet detection accuracy of the wireless signal.

11. A packet detecting system of a wireless signal comprising:

a transmitter configured to transmit the wireless signal;
a receiver configured to receive the wireless signal;
a processor coupled to the receiver and configured to process the wireless signal; and
a memory coupled to the processor and configured to save data;

wherein the processor generates a local characteristic sequence, executes a cross-correlation operation between the wireless signal and the local characteristic sequence for acquiring a first cross-correlation result, the processor generates at least one interference characteristic sequence according to the local characteristic sequence, a signal sampling frequency of the receiver, and at least one working frequency difference, executes a cross-correlation operation between the wireless signal and the at least one interference characteristic sequence for acquiring a second cross-correlation result, the processor detects a center frequency of the wireless signal for determining if a packet of the wireless signal is transmitted through a target channel according to the first correlation result and the second correlation result, and the at least one interference characteristic sequence corresponds to at least one interference frequency.

12. The system of claim 11, wherein the processor detects a peak value of the first cross-correlation result, determines if a periodic peak value is present, and determines if a plurality of peak values are greater than a threshold during Nsym symbol periods of the wireless signal, and Nsym is a positive integer.

13. The system of claim 12, wherein when the periodic peak value is present and the plurality of peak values are greater than the threshold during the Nsym symbol periods of the wireless signal, the packet format of the wireless signal is detected as the target packet format by the processor, and when the periodic peak value is absent or at least one peak value is smaller than the threshold during the Nsym symbol periods of the wireless signal, the packet format of the wireless signal is not the target packet format.

14. The system of claim 11, wherein the processor determines the at least one interference frequency, determines the at least one working frequency difference according to a working frequency and the at least one interference frequency, and rotates each phase of the local characteristic sequence for generating the at least one interference characteristic sequence according to the local characteristic sequence, the signal sampling frequency, and the at least one working frequency difference.

15. The system of claim 11, wherein the processor detects a peak value of the second cross-correlation result between the wireless signal and the at least one interference characteristic sequence during each symbol period, and acquires at least one total peak value corresponding to the at least one interference characteristic sequence during a plurality of symbol periods.

16. The system of claim 15, wherein the processor detects a peak value of the first cross-correlation result between the wireless signal and the local characteristic sequence during the each symbol period, acquires a total peak value corresponding to the local characteristic sequence during the plurality of symbol periods, the processor determines that the wireless signal having the center frequency is transmitted through the target channel when the total peak value corresponding to the local characteristic sequence is greater than a linear combination result formed by combining the at least one total peak value corresponding to the at least one interference characteristic sequence with a threshold, generates a successful reception message of receiving the packet of the wireless signal transmitted through the target channel, and the threshold is a positive integer.

17. The system of claim 15, wherein the processor detects a peak value of the first cross-correlation result between the wireless signal and the local characteristic sequence during the each symbol period, acquires a total peak value corresponding to the local characteristic sequence during the plurality of symbol periods, and the processor generates a reception failure message of receiving the packet of the wireless signal transmitted through an interference channel when the total peak value corresponding to the local characteristic sequence is smaller than a linear combination result formed by combining any total peak value of the at least one total peak value with a threshold, and the threshold is a positive integer.

18. The system of claim 11, wherein the processor generates the at least one interference characteristic sequence according to the local characteristic sequence, the signal sampling frequency, and the at least one working frequency difference satisfies an equation:

$$I_m = \left\{ c_0 \quad c_1 e^{\frac{j2\pi\Delta f_m}{f_s}} \quad \ldots \quad c_{K-1} e^{\frac{j2\pi\Delta f_m(K-1)}{f_s}} \right\}$$

where $I_m$ is an $m^{th}$ interference characteristic sequence, $\{c_0 \ c_1 \ldots c_{K-1}\}$ is the local characteristic sequence, $f_s$ is the signal sampling frequency, $\Delta f_m$ is an $m^{th}$ working frequency difference, and K is a positive integer.

19. The system of claim 18, wherein when the packet of the wireless signal is transmitted through the target channel, the center frequency of the wireless signal is substantially equal to a working frequency.

20. The system of claim 11, wherein the processor executes an automatic gain control (AGC) process and/or a carrier frequency offset (CFO) compensation process to the wireless signal for increasing a packet detection accuracy of the wireless signal.

\* \* \* \* \*